Jan. 23, 1923.
W. B. REYNOLDS.
ANTIFRICTION BEARING.
FILED DEC. 2, 1921.
1,442,907.
2 SHEETS—SHEET 1.
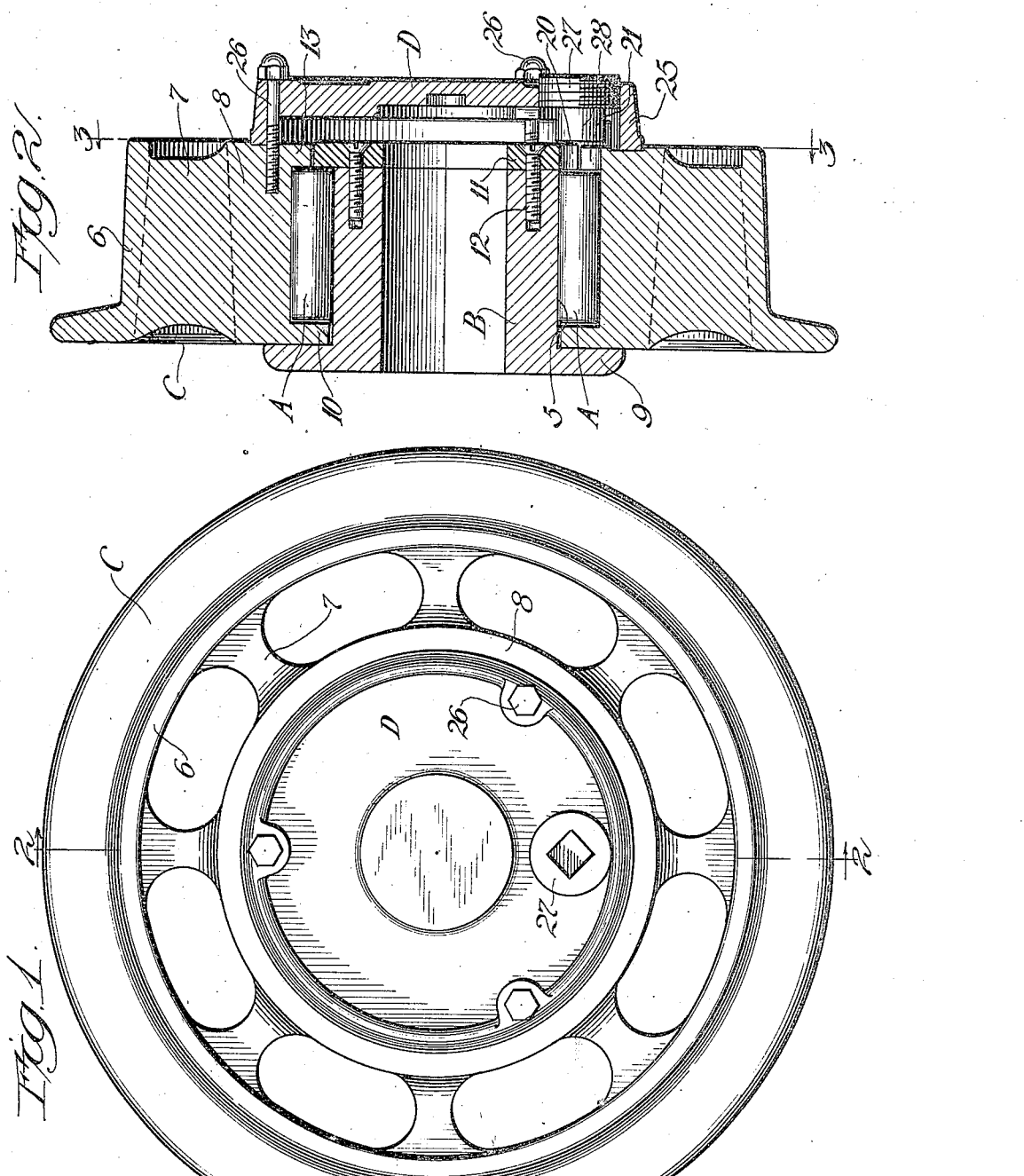

Jan. 23, 1923.　　　　　W. B. REYNOLDS.　　　　　1,442,907.
ANTIFRICTION BEARING.
FILED DEC. 2, 1921.
2 SHEETS—SHEET 2.
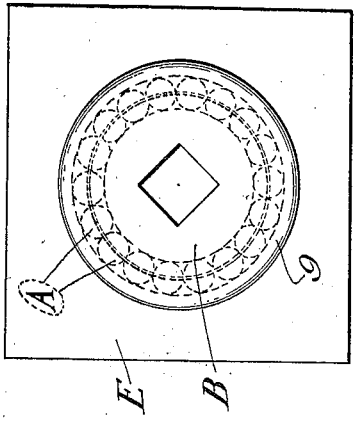
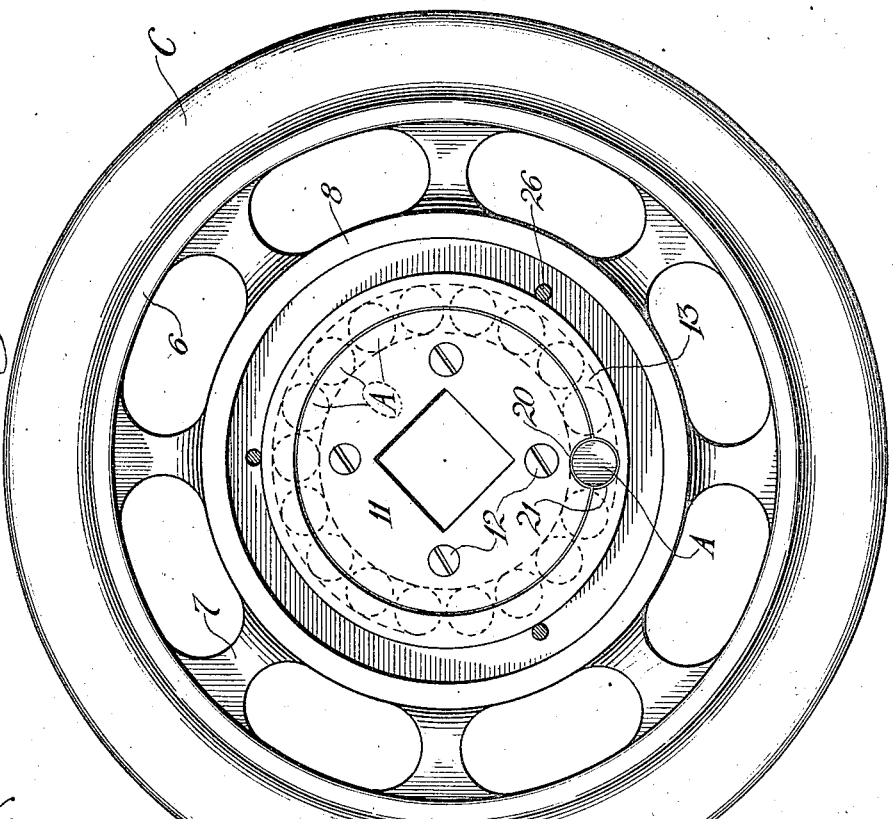
Witness:
Harry S. Gaither
Inventor
William B. Reynolds.
by Patented Jan. 23, 1923.

1,442,907

UNITED STATES PATENT OFFICE.

WILLAN B. REYNOLDS, OF ROUNDUP, MONTANA, ASSIGNOR TO REYNOLDS & SCHUSTER, OF JOLIET, ILLINOIS, A COPARTNERSHIP COMPOSED OF HIMSELF AND MARTIN B. SCHUSTER.

ANTIFRICTION BEARING.

Application filed December 2, 1921. Serial No. 519,353.

*To all whom it may concern:*

Be it known that I, WILLAN B. REYNOLDS, a citizen of the United States, residing at Roundup, in the county of Mussellshell and State of Montana, have invented certain new and useful Improvements in Antifriction Bearings, of which the following is a specification.

This invention relates to a bearing equipped with antifriction members such as rollers, its use being suggested in connection with car wheels, such as are commonly used in mines, construction work, etc. The invention is adaptable to many other uses, however, as will hereinafter appear. Among its principal objects is the provision of a raceway for the bearing members such that they are securely held in place and sealed against water, dirt, tampering, etc.

An exemplification of this invention is shown in the drawings in the manner following:

Figure 1 is an elevation of the outer side of a car wheel equipped with the present bearing;

Fig. 2 is a transverse section therethrough on line 2—2 of Fig. 1;

Fig. 3 is a sectional view taken on line 3—3 of Fig. 2; and

Fig. 4 exhibits merely the bearing so as to show its adaptability to other uses.

In the first three figures of the drawings I have shown antifriction members A in the form of rollers which are operatively placed in a raceway 5 that is formed in the hub B of a wheel C having a flanged rim 6 connected by spokes 7 to a felly 8. An annular flange 9 projecting outwardly from one hub end is adapted to overlie the proximate end of the felly whereon is formed an inwardly projecting flange 10 extending into the raceway of the hub. Secured to the opposite end of the hub is a plate 11 of such a diameter as to partly overlap the raceway end, so as to provide a retaining wall for the rollers A, screws or bolts 12 being a convenient means of connection therefor. Additional retaining means is afforded by an inwardly extending flange 13 that projects from the felly in alignment with the plate 11, the flange and plate about meeting in the circular path of the roller axes. It will be noted that the flange last mentioned and plate 11 project across the raceway a distance nearly equal to the radius of each roller, whereas the other felly flange 10 extends into the raceway for practically its full depth, or a distance about equal to the diameter of the several rollers. The length of each roller bearing is such that it occupies the entire space between the two felly flanges. Of the three flanges and plate 11 thus far mentioned, it will be observed that two are overlapped in telescoping relation at one end of the raceway, whereas the other two are aligned and meet at the other end of the bearing in the axial path of the rollers therein contained.

The retaining walls of the raceway are unbroken throughout their peripheries except for a semi-circular opening 20 which is formed in the plate 11 and a similar opening formed in the flange 13. These openings, when in register as indicated in Fig. 3, are of a size to permit the insertion or withdrawal of a single roller bearing, but it is only when this relation obtains that a sufficient clearance is provided for this purpose. In use, during periods of operation, there is relative rotation between the hub B and wheel C and consequently the two openings 20 and 21 are brought into registering relation only momentarily. At all times the bearings are prevented from endwise movement in the raceway, the time interval, when registration of the two openings 20 and 21 does occur, being so short as to render it impossible for any of the bearings to shift their endwise positions.

With a construction such as is here described, it may be found advantageous to use a protecting cap D, such as is shown in Fig. 2. As shown, this cap is provided with marginal walls 25 whose edges are adapted to bear against the wheel felly 8. As by means of bolts 26, the cap is secured firmly to the wheel. Threaded into the cap is a plug 27 having a boss 28 which aligns with the axes of the various roller bearings, this boss lying close to the circular path of the two openings 20 and 21. By removing this plug it is unnecessary to take off the cap in case it is desired to gain access to the raceway for the purpose of removing or replacing any of the rollers, or for applying lubricant thereto.

The bearing herein shown may be employed in many capacities where there is relative rotation between two parts. In Fig. 4, for instance, the bearing is shown associated with a stationary element E such as renders it adaptable for supporting a rotating shaft. The features of novelty which characterize this invention render it applicable for many uses. The combination of two relatively rotatable units each formed specially to co-operate with the other to provide an enclosed raceway for the bearings, the provision of the cap by which the raceway is protected against water, air, dirt, etc., are elements which contribute to this invention.

I claim:

1. A bearing comprising, in combination, two relatively rotatable elements, the first of which is formed with a raceway and with an end flange overlapping the second element, a flange extending from the second element into the raceway for the full depth thereof and offset with respect to the end flange of the first element so as to lie adjacent thereto, a second flange extending from the opposite end of the second element into the raceway for substantially one-half its depth, a wall in alignment with the flanges last mentioned extending thereto from the first element, anti-friction members in the raceway confined against movement endwise of the bearing by the two flanges and wall of the bearing by the two flanges and wall last mentioned, there being in each of the aligned flange and wall a semi-circular opening adapted when in register with the other to provide an open space through which a single anti-friction member may be inserted in or withdrawn from the raceway, and a cap carried by one of said elements adapted to provide an enclosure over the flange and wall wherein the semi-circular openings are formed, substantially as described.

2. A bearing comprising, in combination, two relatively rotatable elements the first of which is formed with a raceway, a flange extending from one end of the element and a wall from the other, two flanges extending from the second element, one offset with respect to the flange from the first element and adapted to lie adjacent thereto, and the other in alignment with the wall of the first element and adapted to meet therewith, the offset flange on the second element extending for substantially the full depth of the raceway while the aligned flange and wall are each extended for substantially one-half the depth of the raceway, anti-friction members within the raceway confined against endwise movement therein by one offset flange and the aligned flange and wall, there being in each of the aligned flange and wall a semi-circular opening adapted when in register with the other to afford a clearance sufficient for the insertion in or withdrawal from the raceway of a single anti-friction member, and means providing a closure for both of said semi-circular openings, substantially as described.

3. A bearing comprising, in combination, two relatively rotatable elements one arranged interiorly of the other, the inner element being formed with a raceway and with an end flange adapted to overlap the proximate end of the outer element, a complementary flange offset with respect to the other and projecting from the outer element into the raceway adjacent to the end flange of the inner element, a second flange projecting from the opposite end of the outer element into the raceway for substantially one-half its depth, a wall removably carried by the inner element in alignment with the last mentioned flange and adapted to extend into proximity thereto to complete an enclosure for the raceway, anti-friction members within the raceway confined against endwise movement by the flanges and wall extending thereinto, an opening in each aligned flange and wall adapted when in register with the other to provide a clearance sufficient for the insertion in or withdrawal from the raceway of a single anti-friction member, a cap removably carried by the outer of said elements and providing a closure for the raceway, and a plug removably carried in the cap in alignment with the circular path of the axes of the several anti-friction members, said plug having a boss extended into proximity with the outer face of the aligned flange and wall, substantially as described.

WILLAN B. REYNOLDS.

Certificate of Correction.

It is hereby certified that the name of the patentee in Letters Patent No. 1,442,907, granted January 23, 1923, for an improvement in "Antifriction Bearings," was erroneously written and printed as "Willan B. Reynolds," whereas said name should have been written and printed as *William B. Reynolds;* and that the said Letters Patent should be read with this correction therein that the same may conform to the record of the case in the Patent Office.

Signed and sealed this 27th day of February, A. D., 1923.

[SEAL.]

KARL FENNING,
*Acting Commissioner of Patents.*